(12) United States Patent
Kawashima et al.

(10) Patent No.: US 8,922,089 B2
(45) Date of Patent: Dec. 30, 2014

(54) DIRECT-CURRENT MOTOR ARMATURE, DIRECT-CURRENT MOTOR, AND METHOD FOR WINDING COIL AROUND ARMATURE OF DIRECT-CURRENT MOTOR

(75) Inventors: Yoshichika Kawashima, Kiryu (JP); Naoki Shioda, Kiryu (JP)

(73) Assignee: Mitsuba Corporation, Kiryu-shi (JP)

( * ) Notice: Subject to any disclaimer, the term of this patent is extended or adjusted under 35 U.S.C. 154(b) by 296 days.

(21) Appl. No.: 12/312,199

(22) PCT Filed: Oct. 29, 2007

(86) PCT No.: PCT/JP2007/071013
§ 371 (c)(1),
(2), (4) Date: Apr. 28, 2009

(87) PCT Pub. No.: WO2008/053829
PCT Pub. Date: May 8, 2008

(65) Prior Publication Data
US 2009/0315426 A1    Dec. 24, 2009

(30) Foreign Application Priority Data

Oct. 30, 2006  (JP) .................. 2006-293868
Oct. 24, 2007  (JP) .................. 2007-276373

(51) Int. Cl.
*H02K 1/10*  (2006.01)
*H01R 39/32*  (2006.01)
*H02K 23/30*  (2006.01)
*H02K 23/38*  (2006.01)

(52) U.S. Cl.
CPC .............. *H02K 23/38* (2013.01); *H02K 23/30* (2013.01)
USPC ......................................... 310/195; 310/234

(58) Field of Classification Search
CPC .............................. H02K 13/04; H02K 13/08
USPC .................. 310/197, 225, 204, 220, 233–237
See application file for complete search history.

(56) References Cited

U.S. PATENT DOCUMENTS 6,127,759 A * 10/2000 Tanaka et al. ................. 310/233
6,320,293 B1 * 11/2001 Yamada et al. ............... 310/233
(Continued)

FOREIGN PATENT DOCUMENTS

JP    2001-286085    10/2001
JP    2002-305861    10/2002
(Continued)

OTHER PUBLICATIONS

JP 2003-079121 Translation, http://dossier1.ipdl.inpit.go.jp.*

(Continued)

*Primary Examiner* — Tran Nguyen
*Assistant Examiner* — Thomas Truong
(74) *Attorney, Agent, or Firm* — Kenyon & Kenyon LLP (57) ABSTRACT

In a direct-current motor armature 3 corresponding to an 8-pole-10-slot-20-segment or 12-pole-15-slot-30-segment, a connection wire 25 for short-circuiting segments 14 having the same degree of electric potential is provided to a commutator, a coil 12 is connected electrically to the segments 14 having a potential difference that is equal to a potential difference between the adjacent segments 14, and the coil 12 is wound around teeth 9 to form armature coils 7. Accordingly, an armature for use in a direct-current motor, a direct-current motor, and a method for winding wires around the armature of the direct-current motor for enabling down-sized direct-current motors having extended product life and enhanced performance can be provided.

8 Claims, 8 Drawing Sheets

(56) References Cited

U.S. PATENT DOCUMENTS

| | | | |
|---|---|---|---|
| 6,614,142 B1 * | 9/2003 | Bonnieman et al. ... | 310/216.004 |
| 6,756,717 B2 * | 6/2004 | Yamamoto et al. ........... | 310/225 |
| 6,819,025 B2 * | 11/2004 | Egawa et al. .......... | 310/216.001 |
| 7,239,063 B2 * | 7/2007 | Yamamoto et al. ........... | 310/239 |
| 7,550,893 B2 * | 6/2009 | Aoyama et al. ............... | 310/264 |
| 7,605,516 B2 * | 10/2009 | Santo et al. ................... | 310/233 |
| 7,888,836 B2 * | 2/2011 | Santo ............................ | 310/233 |
| 2004/0095036 A1 | 5/2004 | Yamamoto et al. | |
| 2006/0208605 A1 * | 9/2006 | Aoyama et al. ............... | 310/264 |
| 2006/0220489 A1 * | 10/2006 | Osawa et al. ................. | 310/198 |

FOREIGN PATENT DOCUMENTS

| | | |
|---|---|---|
| JP | 2003-79121 | 3/2003 |
| JP | 2004-88916 | 3/2004 |
| JP | 2004-096836 | 3/2004 |
| JP | 2006-204070 | 8/2006 |
| JP | 2008-283849 | 11/2008 |

OTHER PUBLICATIONS

Statement From Client Regarding Prior Art Search done on Nov. 16, 2011.

Japanese Decision of Rejection mailing date of Dec. 11, 2012 on the underlying Application No. 2007-276373 with English translation thereof.

* cited by examiner

DIRECT-CURRENT MOTOR ARMATURE, DIRECT-CURRENT MOTOR, AND METHOD FOR WINDING COIL AROUND ARMATURE OF DIRECT-CURRENT MOTOR

TECHNICAL FIELD

The present invention relates to the a direct-current motor armature mounted on vehicles etc., a direct-current motor, and a method for winding coils around the armature of a direct-current motor.

The present application claims priority from patent application No. 2006-293868 filed in Japan on Oct. 30, 2006, and patent application No. 2007-276373 filed in Japan on Oct. 24, 2007, the content of which are incorporated herein by reference.

DISCLOSURE OF INVENTION

Problems to be Solved by the Invention

Conventionally, direct-current brush motors mounted on vehicles or the like have been known. Direct-current motors of this type have a freely rotatable armature having armature coils wound therearound and disposed within a cylindrical yoke having an even number of magnets provided on an inner periphery of the direct-current motor. The armature has armature cores fitted and fixed onto the exterior of a rotation shaft. Each armature core has a tooth having a wire wound therearound and formed in a radial manner in the circumferential direction of the armature core, and slots elongated in the axial direction are formed among the teeth. Each tooth has a wire wound therearound to provide a three-phase coil structure. Each coil is electrically connected to a segment (commutator piece) attached to the rotation shaft. Each segment is capable of sliding on the brush. An electric current is supplied to each coil by charging a voltage to the terminals of the segments from the brush.

The shift of phase among electric currents flowing in the coils forms different magnetic fields among the coils, thereby driving the rotation shaft by means of a magnetic attracting or repulsive force produced between the yoke and the magnets.

In recent years, there has been an increased need for down-sized three-phase direct-current motors having extended product life and enhanced performance. A technical proposal for reducing the motor size aims to reduce cogging torque (vibration produced in a motor) or uneven motor torque by increasing the number of magnetic poles of the magnets and slots, and to enclose a part of the commutator within an enclosure hole formed on the armature cores.

Patent Document 1: Japanese Unexamined Patent Application, First Publication No. 2006-204070

However, an attempt to produce a desirable attracting or repulsive magnetic force between each coil and magnet tends to increase voltage between segments since the number of poles and slots of a motor varies orderly based on the multiple of the number of pole pairs of a 2-pole-3-slot configuration in the aforementioned conventional technique. Therefore, a limit in an attempt to increase the durability of a brush results in a drawback that the attempt to produce a magnetic attracting or repulsive force cannot be an effective means of extending the product life of a motor.

In addition, a limit in an attempt to reduce the cogging torque or uneven motor torque also leads to a drawback that the motor performance cannot be enhanced.

To address this, an object of the present invention conceived in view of the aforementioned circumstances is to provide an armature for use in a direct-current motor, a direct-current motor, and a method for winding wires around the armature of the direct-current motor for enabling down-sized direct-current motors having extended product life and enhanced performance.

Means for Solving the Problems

In order to solve the aforementioned drawbacks, according to a first aspect of the present invention, there is a direct-current motor armature, wherein the direct-current motor is of 8-pole-10-slot-20-segment or 12-pole-15-slot-30-segment, the armature comprises: a rotation shaft supported by a yoke pivotably which has a plurality of magnetic poles; a plurality of teeth attached to the rotation shaft and extending radially in radial directions; armature cores formed between the teeth and having a plurality of slots extending in an axial direction; and a commutator provided on the rotation shaft adjacent to the armature cores and having a plurality of segments disposed in a circumferential direction. The armature is characterized in that a short-circuiting component for short-circuiting the segments having the same degree of electric potential is provided to the commutator, a coil is connected electrically to the segments having a potential difference that is equal to a potential difference between the adjacent segments, and the coil is wound around the teeth.

In this case, the coil may be wound continuously around the teeth that correspond to a same phase.

In addition, the coil may be connected to the adjacent segments electrically, and another coil may be wound around each tooth.

In this configuration, since the armature can be of a five-phase structure, an inter-segment voltage can be reduced more significantly than that of a three-phase structure.

Also, short-circuiting the segments having the same degree of electric potential by means of the short-circuiting component eliminates the need to dispose the same number of brushes as that of the segments, thereby, reducing the installed number of brushes.

In addition, since the segments having the same degree of electric potential are short-circuited, it is not necessary to connect the coil-starting end and the coil-finishing end of the coil to the adjacent segments; therefore, the coil-starting end and the coil-finishing end can be connected to the segments existing in the vicinity of the coil-starting end and the coil-finishing end respectively. Therefore, expansion in coil size can be prevented among the commutator and the armature cores.

Further, a direct-current motor may use the direct-current motor armature described above.

According to a second aspect of the present invention, there is a coil-winding method for a direct-current motor armature, wherein the direct-current motor is of 8-pole-10-slot-20-segment or 12-pole-15-slot-30-segment, the armature comprises: a rotation shaft supported by a yoke pivotably which has a plurality of magnetic poles; a plurality of teeth attached to the rotation shaft and extending radially in radial directions; armature cores formed between the teeth and having a plurality of slots extending in an axial direction; and a commutator provided on the rotation shaft adjacent to the armature cores and having a plurality of segments disposed in a circumferential direction, and the method comprises: short-circuiting the segments having the same degree of electric potential by means of the short-circuiting component; connecting a coil electrically to the segments having a potential difference that is equal to a potential difference between the adjacent segments, and winding the coil continuously around the teeth that correspond to the same phase.

According to a third aspect of the present invention, there is a coil-winding method for a direct-current motor armature, wherein the direct-current motor is of 8-pole-10-slot-20-segment or 12-pole-15-slot-30-segment, the armature comprises: a rotation shaft pivotably supported by a yoke which has a plurality of magnetic poles; a plurality of teeth attached to the rotation shaft and extending radially in radial directions; armature cores formed between the teeth and having a plurality of slots extending in an axial direction; and a commutator provided on the rotation shaft adjacent to the armature cores and having a plurality of segments disposed in a circumferential direction, and the method comprises: short-circuiting the segments having the same degree of electric potential; connecting a coil electrically to the adjacent segments, and winding another coil around each tooth.

Effects of the Invention

According to the present invention, since the armature can be of a five-phase structure, an inter-segment voltage can be reduced more significantly relative to that of a three-phase structure. Accordingly, the extended product life of brush results in extending the product life of the motor.

Also, since the five-phase structure motor having a less significant variance in electric current per rotation than that of a three-phase structure motor, the cogging torque or uneven torque of motor can be reduced more effectively than those of the three-phase structure motor. Accordingly, the performance of the direct-current motor can be enhanced.

In addition, short-circuiting the segments having the same degree of electric potential by means of the short-circuiting component eliminates the need to dispose the same number of brushes as that of the segments, thereby, reducing the installed number of brushes. Accordingly, the reduced number of parts enables a reduced production cost and downsizing of a direct-current motor.

In addition, since the segments having the same degree of electric potential are short-circuited, it is not necessary to connect the coil-starting end and the coil-finishing end of the coil to the adjacent segments; therefore, the coil-starting end and the coil-finishing end can be connected to the segments existing in the vicinity of the coil-starting end and the coil-finishing end respectively. Therefore, expansion in coil size can be prevented among the commutator and the armature cores. Accordingly, the direct-current motor can be downsized.

Furthermore, according to the present invention, the use of the armature described above enables a direct-current motor having a more reduced size, longer product life, and a higher performance than those of the three-phase direct-current motor.

EXPLANATION OF REFERENCE NUMERALS AND SYMBOLS

1: electric motor
2: motor housing (yoke)
3: armature
4: permanent magnets (magnetic poles)
5: rotation shaft
6: armature
7: armature coils
7a: first coil (coil)
7b: second coil (coil)
7c: third coil (coil)
9: teeth
11: slots
12: coil
13: commutator
14, 14a, 14b, 14c, 14d, 14e, 14f: segments
25: connection line (short-circuiting component)

BEST MODE FOR CARRYING OUT THE INVENTION

Referring now to FIGS. 1 to 6, a first embodiment of the present invention will be explained.

Figure 1:
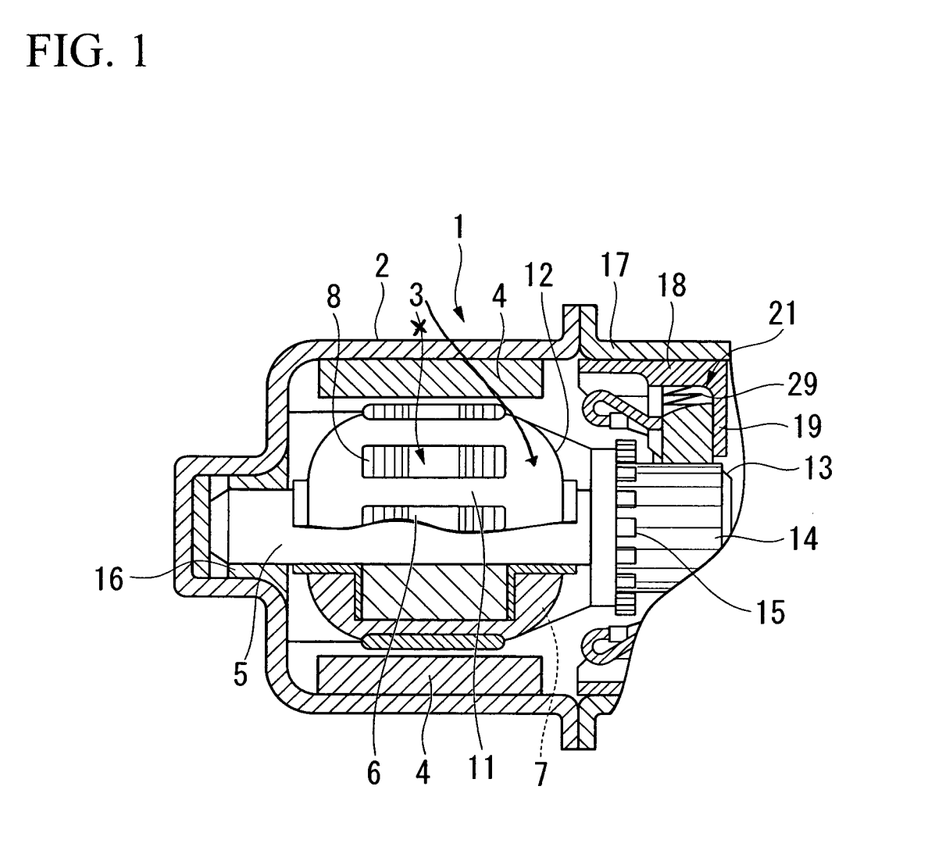
FIG. 1 is a longitudinal cross section of an electric motor in an embodiment of the present invention.
Figure 2:
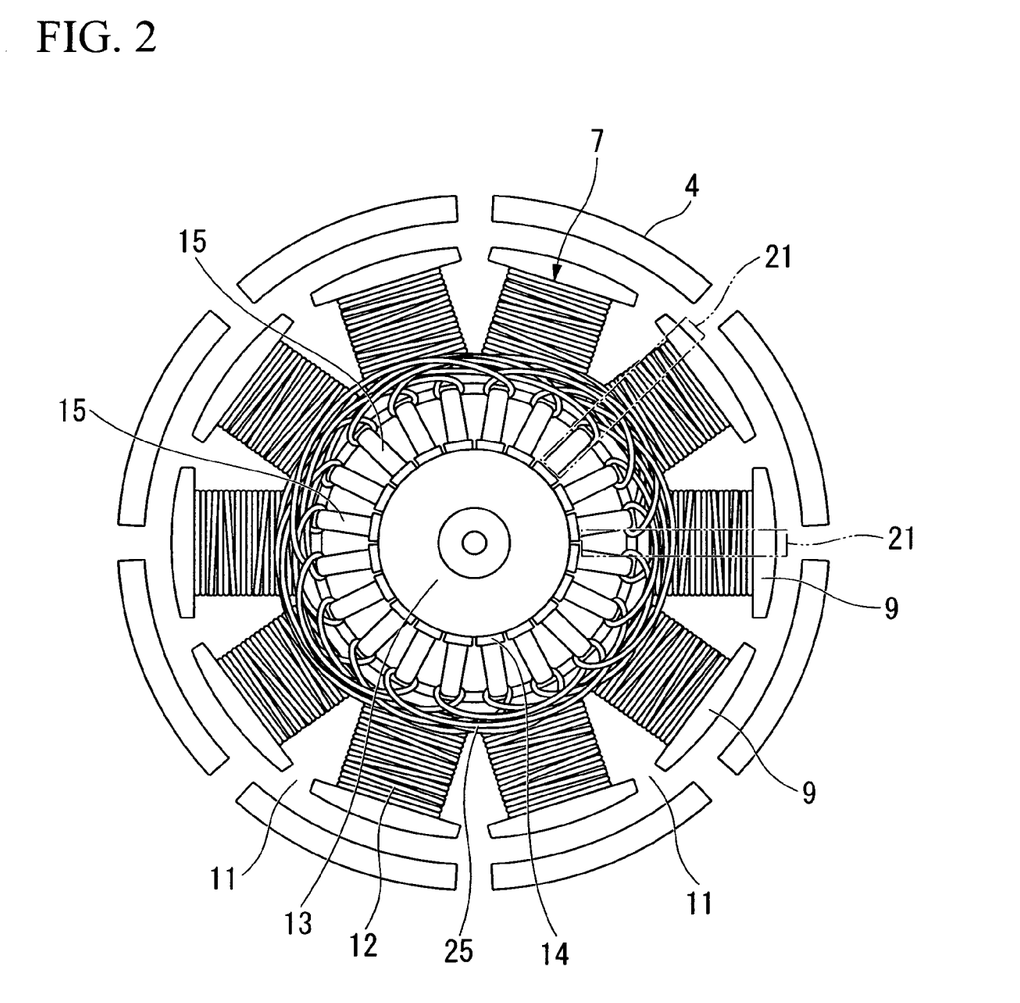
FIG. 2 is a traverse cross section of the electric motor in the embodiment of the present invention.

As shown in FIGS. 1 and 2, an electric motor 1 is a driving source for electrical equipment e.g. a radiator fan mounted on vehicles. The electric motor 1 has a cylindrical motor housing 2 having a bottom section in which a freely rotatable armature 3 is disposed. A plurality of permanent magnets 4 are disposed in the circumferential direction of the motor housing 2 and fixed on the inner periphery of the motor housing 2. More specifically, the motor housing 2 has eight permanent magnets 4, that is, including eight magnetic poles.

The armature 3 includes armature cores 6 fixed on a rotation shaft 5; armature coils 7 wound around the armature cores 6; and a commutator 13 disposed at one end of the armature core 6. The armature core 6 includes a plurality of ring-shaped metal plates 8 laminated in the axial direction. A plurality of (ten pieces in the embodiment) evenly spaced teeth 9 (see FIG. 2) each having a T-letter shape are formed radially on the outer periphery section of the metal plates 8 in the circumferential direction. Fitting the plurality of metal plates 8 onto the exterior of the rotation shaft 5 causes helical slots 11 to be formed among adjacent teeth 9 on the outer peripheries of the armature cores 6. Each slot 11 extends in the axial direction. The plurality of equally spaced slots 11 (10 slots in the present embodiment) are formed in the circumferential direction. Enamel-coated coils 12 disposed among the slots 11 form the plurality of armature coils 7 each wound around the outer periphery of each armature core 6.

The commutator 13 is fitted onto and fixed around the exterior of an end of the rotation shaft 5. A plurality of segments 14 (twenty pieces in the embodiment) each made of a conductive member are attached on the outer periphery of the commutator 13.

The equally spaced segments 14 made of metal plate pieces elongated in the axial direction are insulated from each other. The segments 14 are disposed and fixed side by side in the circumferential direction. A riser 15 bent outward radially is formed on and united with the end of each segment 14 in the vicinity of the armature cores 6. The coil 12 having a coil-starting end section and a coil-finishing end section is wound around each riser 15 to form the armature coil 7. The coil 12 is fixed to the riser 15 by means of fusing. This allows each segment 14 to be connected electrically with each corresponding armature coil 7.

In addition, as shown in FIG. 2, a connection wire 25 is wound around the risers 15 that correspond to the segments 14 having the same degree of electric potential (in the embodiment, five segments 14 spaced by every four pieces). Each connection wire 25 is fixed to the risers 15 by means of fusing. The connection wire 25 serves for short-circuiting the segments 14 having the same degree of electric potential, and is wired between the commutator 13 and the armature cores 6.

As shown in FIG. 1, the other end of the rotation shaft 5 is rotatably supported by a bearing 16 formed within an embossed part of the motor housing 2. A cover 17 is provided on an opening end of the motor housing 2. A holder stay 18 is attached on an inner periphery of the cover 17. The holder stay 18 has two brush holders 19 separated by 45 degrees in the circumferential direction. Each brush holder 19 has a freely projecting brush 21 biased by a spring 29 and disposed thereinside. The tip sections of these brushes 21 biased by the springs 29 and slidably contacting the commutator 13 cause an external power source to be supplied via the brushes 21 to the commutator 13.

In this configuration of the electric motor 1 having 8 poles, 10 slots, and 20 segments, the coil 12 is wound around the armature 3 in the following manner.

Figure 3:
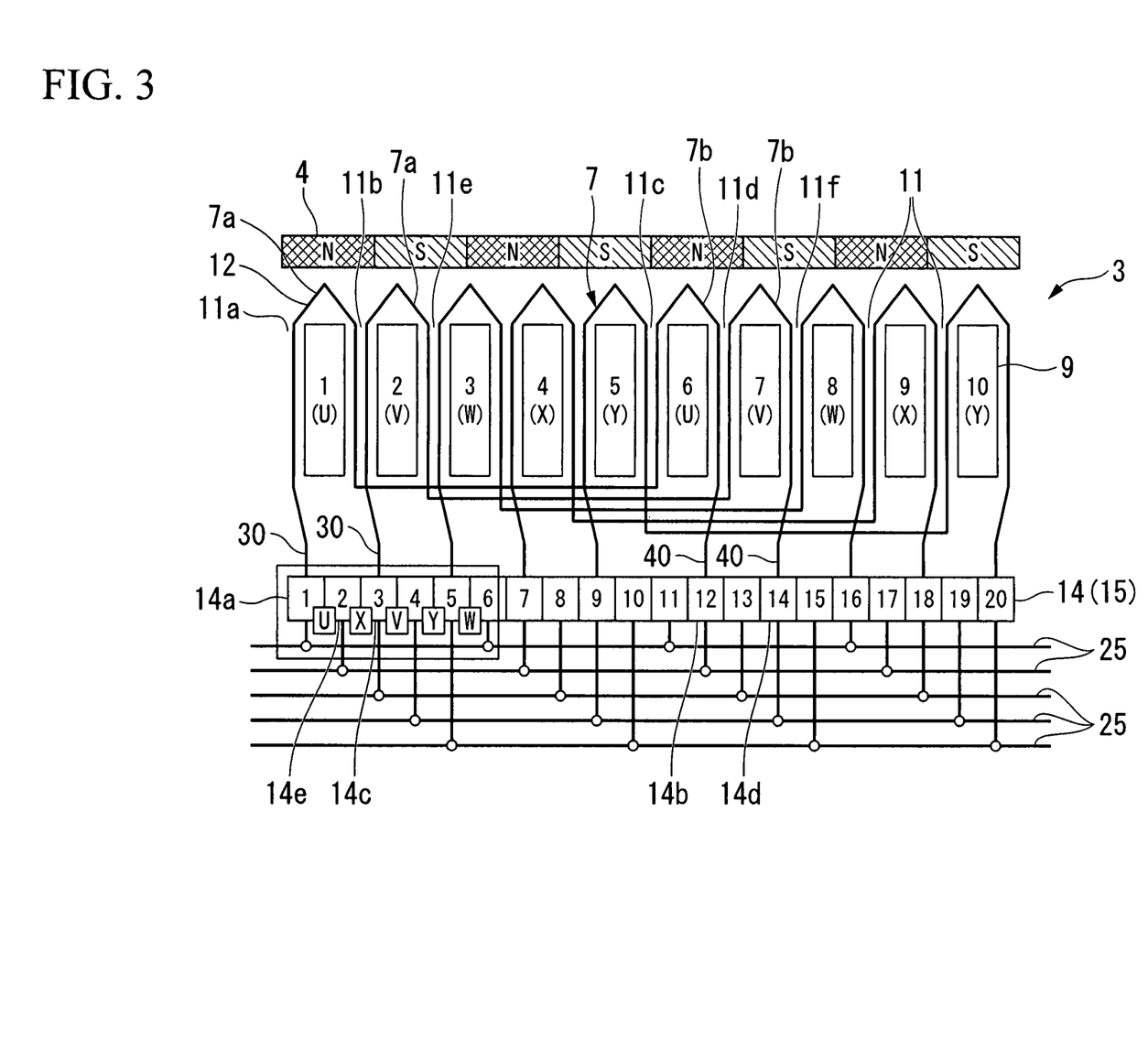
FIG. 3 is a developed view of an armature having armature coils wound therearound in a first embodiment of the present invention.

FIG. 3 is a developed view showing the segments 14 (risers 15) of the armature 3, the teeth 9, the permanent magnets 4 fixed in the vicinity of the motor housing 2, and the connection wires 25. Spaces among the adjacent teeth 9 correspond to the slots 11. In the following, the segments 14, the teeth 9, and the wound coils 12 will be explained with reference to reference symbols allocated thereto.

As shown in FIG. 3, the segments 14 having the same degree of electric potential are short-circuited by the connection wire 25. That is, the segments 14 every four pieces are short-circuited by the connection wire 25.

In addition, each tooth 9 has a U, V, W, X, or Y phase allocated in the circumferential direction in this order. That is, the first and sixth teeth 9 correspond to the U phase, the second and seventh teeth 9 correspond to the V phase, the third and eighth teeth 9 correspond to the W phase, the fourth and ninth teeth 9 correspond to the X phase, and the fifth and tenth teeth 9 correspond to the Y phase.

For example, the coil-starting end 30 of the coil 12 is first wound around a first segment 14a, and then wound around the riser 15 of the first segment 14a. After that, the coil 12 is attracted into a slot 11a provided between the first and tenth teeth 9 existing in the vicinity of the first segment 14a. Subsequently, the coil 12 is wound n times (n is an integer corresponding to 1 or greater) around the first tooth 9 to form a first coil 7a.

Subsequently, the coil 12 is drawn from a slot 11b provided between the first and second teeth 9, and then attracted into a slot 11c provided between the fifth and sixth teeth 9. Subsequently, the coil 12 is wound n times around the sixth tooth 9 to form a second coil 7b. The first tooth 9 and the sixth tooth 9 are positioned symmetrically with respect to the center of the rotation shaft 5.

The coil 12 upon forming the second coil 7b is drawn from a slot 1d provided between the sixth and the seventh teeth 9, and then wound around the riser 15 of a twelfth segment 14b existing in the vicinity of the sixth tooth 9. Subsequently, a coil-finishing end 40 of the coil 12 is connected to the twelfth segment 14b. Consequently, the armature coil 7 (U phase), wound around the first and sixth teeth 9 and provided with a pair of coils 7a and 7b connected in series, is formed between the first and twelfth segments 14a and 14b. It should be noted that the connection wire 25 short-circuits the twelfth segment 14b having the coil-finishing end 40 connected thereto and a second segment 14e adjacent to the first segment 14a. Therefore, the potential difference between the first segment 14a and the twelfth segment 14b is equal to the potential difference between the adjacent segments.

Similarly, for example, the coil-starting end 30 of the coil 12 is first wound around a third segment 14c and then wound around the riser 15 of the third segment 14c. After that, the coil 12 is attracted into a slot 11b provided between the first and second teeth 9 existing in the vicinity of the third segment 14c. Subsequently, the coil 12 is wound n times around the second tooth 9 to form the first coil 7a.

Subsequently, the coil 12 is drawn from a slot 11e provided between the second and third teeth 9, and then attracted into the slot 11d provided between the sixth and the seventh teeth 9. Subsequently, the coil 12 is wound n times around the seventh tooth 9 to form the second coil 7b. The second tooth 9 and the seventh tooth 9 are positioned symmetrically with respect to the center of the rotation shaft 5.

The coil 12 upon forming the second coil 7b is drawn from a slot 11f provided between the seventh and the eighth teeth 9, and then wound around the riser 15 of a fourteenth segment 14d existing in the vicinity of the seventh tooth 9. Subsequently, a coil-finishing end 40 of the coil 12 is connected to the fourteenth segment 14d. Consequently, the armature coil 7 (V phase), wound around the second and seventh teeth 9 and provided with the pair of coils 7a and 7b connected in series, is formed between the second segment 14c and the fourteenth segment 14d.

Accordingly, armature coils 7 having five-phase-coil structure (including U, V, W, X, and Y phases) are formed on the armature cores 6 by making coils sequentially in this manner while forming two coils 7a and 7b repeatedly in between each pair of segments 14.

Also, in the resultant structure, the armature coils 7 each corresponding to the U, X, V, Y, or W phase are sequentially connected in this order electrically between the adjacent segments 14 since the segments 14 having the same degree of electric potential are short-circuited by the connection wire 25. That is, the first segment 14a and the second segment 14e are connected by the armature coil 7 corresponding to the U phase; the second segment 14e and the third segment 14c are connected by the armature coil 7 corresponding to the X phase; and the subsequently adjacent segments 14 are connected by the armature coils 7 each corresponding to the X, Y, or W phase respectively.

Therefore, a five-phase motor structure such as the aforementioned first embodiment having the more significant number of variance in the electric current during the rotation than that of the three-phase motor structure can reduce the number of variance of the electric current per commutation, thereby, reducing uneven motor torque.

In addition, the 8-pole-and-10-slot configuration has a 40th order of harmonics. In contrast, an 8-pole-12-slot three-phase direct-current motor having the same number of magnetic poles has a 24th order of harmonics. That is, the direct-current motor having a 8-pole-and-10-slot five-phase structure enables an increased order of harmonics relative to the three-phase direct-current motor, thereby providing a more reduced degree of cogging torque than that of the three-phase direct-current motor.

As a general rule here, the degree is equal to the number of peaks of cogging torque in one rotation of an armature. Therefore, a greater degree can reduce the significance of the cogging torque indicated by the peaks in one rotation of the armature.

Figure 4:
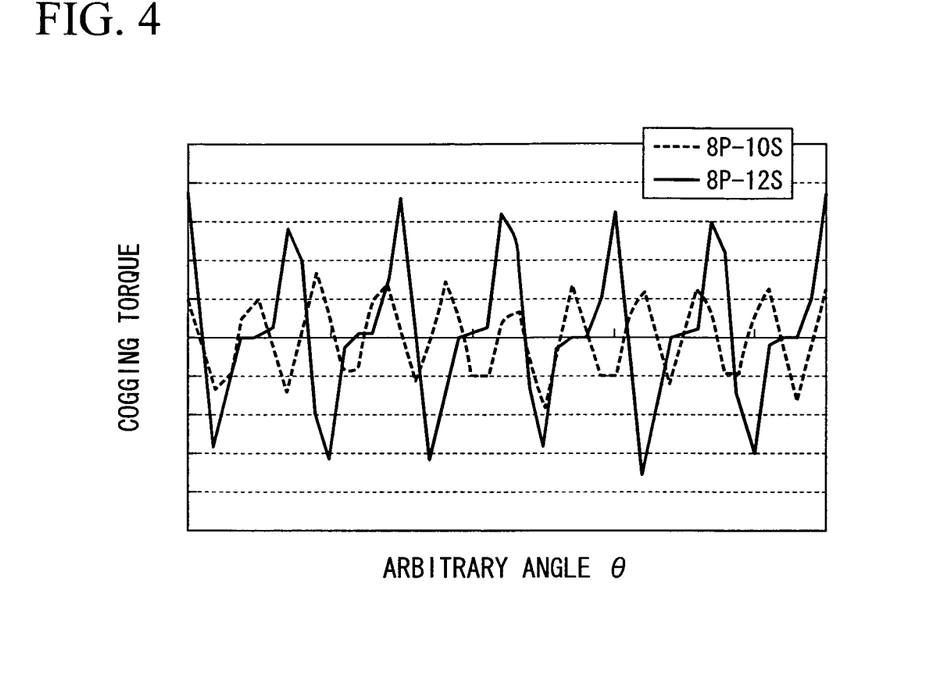
FIG. 4 is a graph of the profile of cogging torque in the first embodiment of the present invention.

FIG. 4 is a comparative graph showing variances of cogging torque curves with respect to the electric motor 1 (8 poles, 10 slots, 8P-10S) of the first embodiment and a conventional three-phase-structure electric motor (8 poles, 12 slots, 8P-12S) where the vertical axis indicates cogging torque and the horizontal axis indicates an arbitrary angle θ of the armature. This reveals that the cogging torque of the electric motor 1 is reduced to half the cogging torque of the conventional electric motor.

Figure 5:
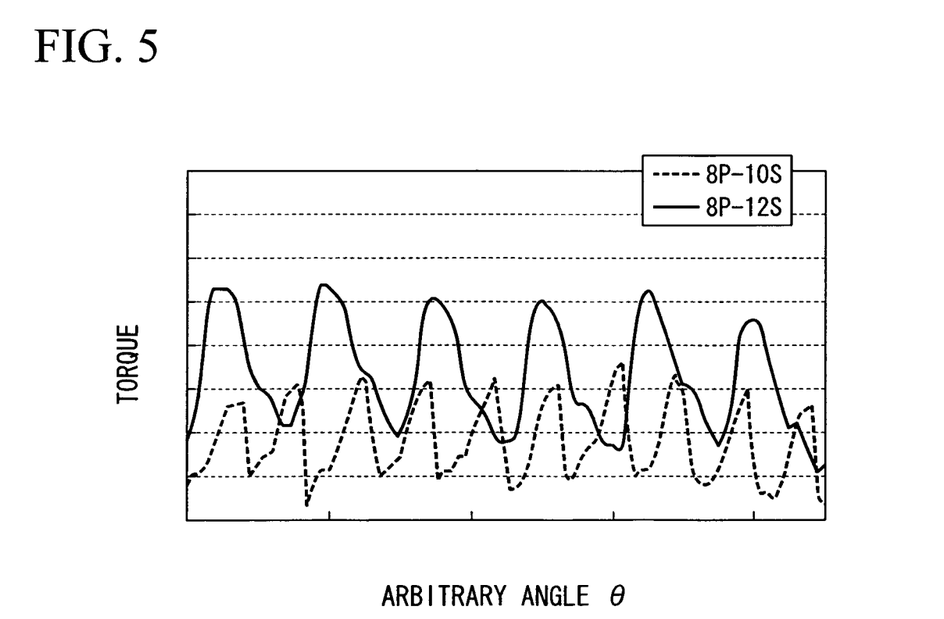
FIG. 5 is a graph of the profile of the torque in the first embodiment of the present invention.

FIG. 5 is a comparative graph showing unevenness of torque curves with respect to the electric motor 1 (8P-10S) of the first embodiment and the conventional electric motor (8P-12S) where the vertical axis indicates torque and the horizontal axis indicates an arbitrary angle θ of the armature. This reveals that the unevenness in torque of the electric motor 1 is reduced to approximately half the unevenness in that of the conventional electric motor.

In addition, the five-phase structure can provide a more reduced inter-segment voltage than that of the three-phase structure, thereby extending the product life of the brushes 21.

Figure 6:
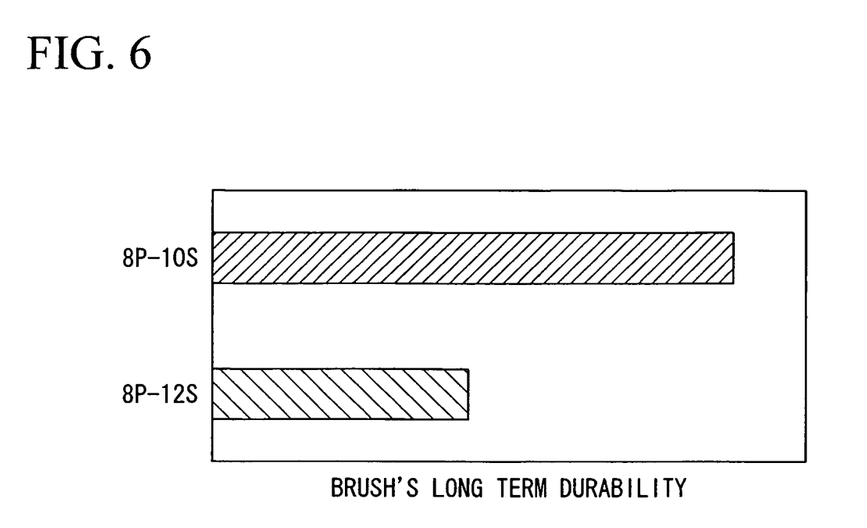
FIG. 6 is a graph of the long-term durability of a brush according to the first embodiment of the present invention.

FIG. 6 is a comparative graph showing long-term durabilites of the brush 21 with respect to the electric motor 1 (8P-10S) of the first embodiment and the conventional electric motor (8P-12S). The drawing reveals that the product life of the brush 21 of the electric motor 1 is extended approximately twice as long as that of the conventional electric motor (8P-12S). In addition, the number of segments 14 installed which is twice as many as that of the slots 11 also reduces the voltage between the segments 14; therefore, permitting farther extension of the product life of the brush 21.

In addition, the number of brushes 21 installed in the aforementioned first embodiment can be reduced since the segments 14 having the same degree of electric potential are short-circuited by the connection wire 25, and since not all the segments 14 must have brushes 21 corresponding to the same phase (U, V, W, X, or Y phase). Accordingly, the reduced number of parts enables a reduced production cost and downsizing of a direct-current motor.

Furthermore, it is not necessary to connect the coil-starting end 30 and the coil-finishing end 40 of the coil 12 to the adjacent segments 14 while the coil-starting end 30 and the coil-finishing end 40 can be connected to the segments 14 existing in the vicinity of the coil-starting end 30 and the coil-finishing end 40 respectively. Therefore, expansion in coil size can be prevented among the commutator 13 and the armature cores 6. Accordingly, the electric motor 1 can be downsized more significantly.

Figure 7:
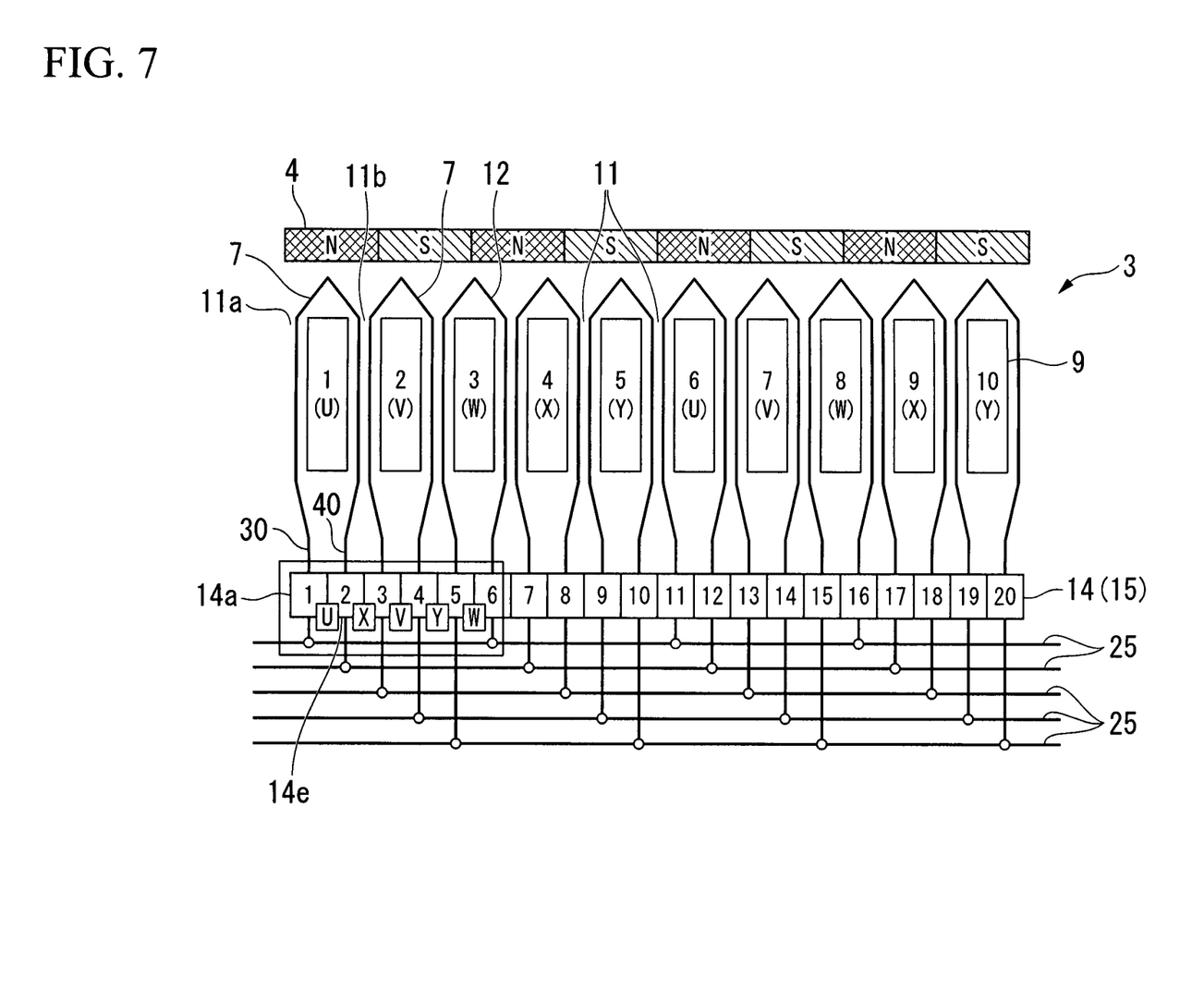
FIG. 7 is a developed view of an armature having armature coils wound therearound in the first embodiment of the present invention.

Although, the first embodiment has been explained referring to the structure in which the armature coil 7 is formed by connecting the pair of serial-connected coils 7a and 7b each formed on the tooth 9 having the same phase, the coil 12 may be connected to the adjacent segments 14 while each tooth 9 has the coil 12 wound therearound as shown in FIG. 7.

In this case, for example, the coil-starting end 30 of the coil 12 is first wound around the first segment 14a, and then wound around the riser 15 of the first segment 14a. After that, the coil 12 is attracted into the slot 11a provided between the first and the tenth teeth 9 existing in the vicinity of the first segment 14a. Subsequently, the coil 12 is wound n times around the first tooth 9.

Subsequently, the coil 12 is drawn from the slot 11b provided between the first and second teeth 9, and then wound around the riser 15 of the second segment 14e adjacent to the first segment 14a. Subsequently, the coil-finishing end 40 is connected to the second segment 14e. Accordingly, the armature coil 7 wound around the first tooth 9 corresponding to the U phase is formed between the first segment 14a and the second segment 14e. Accordingly, the armature coils 7 having five-phase-coil structure (including U, V, W, X, and Y phases) are formed on the armature cores 6 by making coils sequentially in this manner while forming the armature coils 7 each wound around the tooth 9 repeatedly between each pair of segments 14.

Also, in the resultant structure, the armature coils 7 each corresponding to the U, X, V, Y, or W phase are sequentially connected in this order electrically between the adjacent segments 14 since the segments 14 having the same degree of electric potential are short-circuited by the connection wire 25. Furthermore, in this configuration, an electric current is supplied to all the armature coils 7 having a corresponding phase with respect to the segments 14 making contact with the brush 21 in a case of charging a voltage from the brush 21 to the segments 14 via the connection wire 25 to supply the electric current to the armature coils 7.

Accordingly, the armature coil 7 formed to each tooth 9 can increase the number of parallel circuits (the motor has four parallel circuits) relative to the number of parallel circuits (the motor has two parallel circuits) obtained by connecting the pair of serial-connected coils 7a and 7b formed for each tooth 9 having the same phase. Therefore, the diameter of coil 12 can be reduced.

Referring now to FIG. 1, a second embodiment of the present invention will be explained based on FIGS. 8 and 9.

An electric motor 1 explained according to the second embodiment is of 12-pole-15-slot-30-segment structure having twelve permanent magnets 4 (magnetic poles), fifteen slots 11, and thirty segments 14 provided therein. It should be noted that two brush holders 19 are formed while being separated by 30 degrees in the circumferential direction in the second embodiment.

Figure 8:
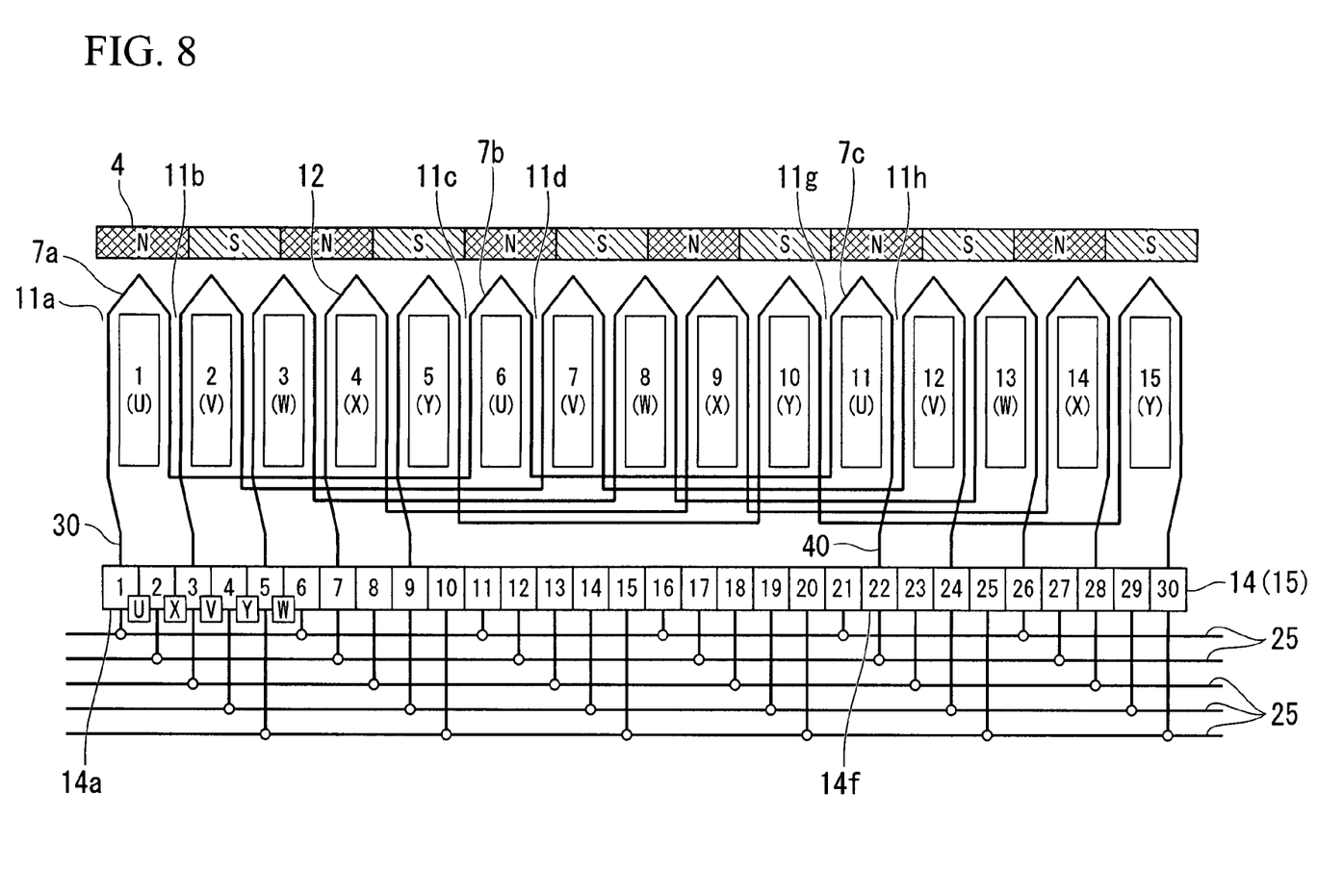
FIG. 8 is a developed view of an armature having armature coils wound therearound in a second embodiment of the present invention.

As shown in FIG. 8, for example, the coil-starting end 30 of the coil 12 is first wound around the first segment 14a, and then wound around the riser 15 of the first segment 14a. After that, the coil 12 is attracted into the slot 11a provided between the first and fifteenth teeth 9 existing in the vicinity of the first segment 14a. Subsequently, the coil 12 is wound n times around the first tooth 9 to form the first coil 7a.

Subsequently, the coil 12 is drawn from a slot 11b provided between the first and second teeth 9, and then attracted into a slot 11c provided between the fifth and sixth teeth 9. Subsequently, the coil 12 is wound n times around the sixth tooth 9 to form a second coil 7b. Furthermore, the coil 12 is drawn from the slot 11d provided between the sixth and seventh teeth 9, and then attracted into a slot 11g provided between the tenth and eleventh teeth 9. Subsequently, the coil 12 is wound n times around eleventh tooth 9 to form a third coil 7c. The first tooth 9, the sixth tooth 9, and the eleventh tooth 9 exist by an interval of 120 degrees respectively.

The coil 12 upon forming the third coil 7c is drawn from a slot 11h provided between the eleventh and twelfth teeth 9, and then wound around the riser 15 of a twenty-second segment 14f existing in the vicinity of the eleventh tooth 9.

Subsequently, the coil-finishing end 40 of the coil 12 is connected to the twenty-second segment 14f. Accordingly, the armature coil 7 corresponding to the U phase and wound around the first tooth 9, the sixth tooth 9, and the eleventh tooth 9 and provided with the serial-connected coils 7a, 7b, and 7c, is formed between the first and twenty-second segments 14a and 14f.

Accordingly, armature coils 7 having five-phase-coil structure (including U, V, W, X, and Y phases) are formed on the armature cores 6 by making coils sequentially in this manner while forming three coils 7a, 7b, and 7c repeatedly between each pair of segments 14.

Therefore, the 12-pole-15-slot-30-segment electric motor 1 according to the aforementioned second embodiment can provide the same effect as that of the first embodiment. In addition, increasing the number of poles of the permanent magnets 4 and the slots 11 can obtain a more reduced cogging torque or unevenness in the torque of the electric motor 1 than those of the first embodiment.

Figure 9:
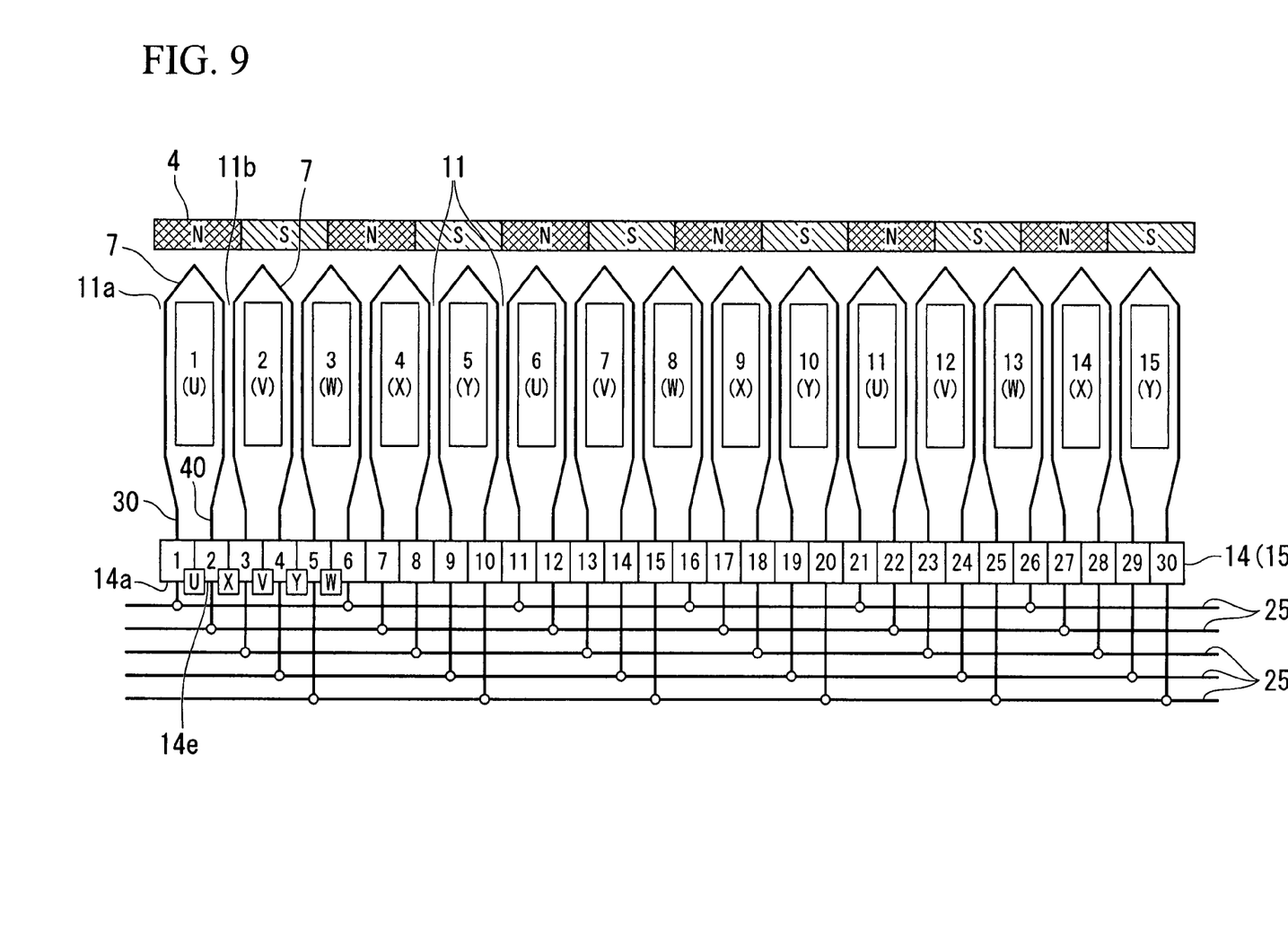
FIG. 9 is a developed view of an armature having armature coils wound therearound in the second embodiment of the present invention.

Although, the second embodiment has been explained referring to the structure in which the armature coil 7 is formed by serial-connecting the three coils 7a, 7b, and 7c each formed on the tooth 9 having the same phase, the coil 12 may be connected to the adjacent segments 14 while each tooth 9 has the coil 12 wound therearound as shown in FIG. 9.

In this case, the number of parallel circuits (the motor has six parallel circuits) can be increased relative to the number of parallel circuits (the motor has two parallel circuits) obtained by serial-connecting the three coils 7a, 7b, and 7c formed for each tooth 9 having the same phase. Therefore, the diameter of coil 12 can be reduced.

It should be noted that the present invention not limited to the aforementioned embodiments includes various forms of modification added to the aforementioned embodiment without departing from the spirit and scope of the present invention.

Also, in the aforementioned embodiments, the segments 14 having the same degree of electric potential are short-circuited by the connection wire 25, the holder stay 18 has two brush holders 19 formed thereon, and each brush holder 19 has a freely projecting brush 21 biased by a spring 29 and disposed thereinside. However, in the present invention, the number of locations for installing the brush holders 19 (brush 21) is limited not to two even if the segments 14 having the same degree of electric potential are short-circuited by the connection wire 25. The brush holders 19 (brush 21) can be installed in extra locations depending on the significance of the current density supplied to each armature coil 7.

In addition, the present invention is not limited to the case of the aforementioned embodiments in which the coil-starting end 30 and the coil-finishing end 40 of the coil 12 are located in the vicinity of the teeth 9 each having the coil 12 wound therearound and connected to the segments 14 corresponding to the phase (U, V, W, X, or Y phase) of the tooth 9. The coil-starting end 30 and the coil-finishing end 40 may be connected to the segments 14 corresponding to the phase of the teeth 9 each having the coil 12 wound therearound.

In addition, although the aforementioned embodiments show the case in which the armature core 6 includes the plurality of ring-shaped metal plates 8 laminated in the axial direction; and the plurality of evenly spaced teeth 9 each having a T-letter shape viewed in cross section are formed radially on the outer periphery section of the metal plates 8 in the circumferential direction, the shape of the armature cores 6 not limited to this configuration may have a divided-core-structure which enables division in the circumferential direction, or may have a predetermined skew angle in which the armature cores 6 incline with respect to the axial direction while being twisted.

The invention claimed is:

1. A direct-current motor armature, the direct-current motor being an 8-pole-10-slot-20-segment or 12-pole-15-slot-30-segment, the armature comprising:
   a rotation shaft pivotably supported by a yoke, the yoke having a plurality of magnetic poles;
   an armature core comprising an armature core body attached to the rotation shaft;
   a plurality of teeth attached to the rotation shaft and extending radially in radial directions; armature cores having a plurality of slots extending in an axial direction, the slots formed between the teeth; and
   a commutator provided on the rotation shaft adjacent to the armature cores and having a plurality of segments disposed in a circumferential direction, wherein
   the motor is a five-phase motor,
   a riser is formed by bending a part of each segment radially outward,
   every five segments having a same degree of electric potential is short-circuited by means of a short-circuiting wire wound around the riser under a state that the commutator and the armature are provided on the rotation shaft,
   a coil is connected electrically to the segments having a potential difference that is equal to a potential difference between the adjacent segments,
   the coil is wound around the teeth, the coil and the short-circuiting wire are together fixed to the riser.

2. The direct-current motor armature according to claim 1, wherein the coil is wound continuously around the teeth that correspond to a same phase.

3. The direct-current motor armature according to claim 1, wherein the coil is connected to the adjacent segments electrically, and the coil is wound around each individual tooth.

4. A direct-current motor using the direct-current motor armature according to claim 1.

5. A direct-current motor using the direct-current motor armature according to claim 2.

6. A direct-current motor using the direct-current motor armature according to claim 3.

7. A coil-winding method for a direct-current motor armature, the direct-current motor being an 8-pole-10-slot-20-segment or 12-pole-15-slot-30-segment, the armature comprising:
   a rotation shaft supported by a yoke pivotably, the yoke having a plurality of magnetic poles;
   an armature core comprising an armature core body attached to the rotation shaft;
   a plurality of teeth attached on the armature core body and extending radially in radial directions, the armature core having a plurality of slots extending in an axial direction, the slots formed between the teeth; and
   a commutator provided on the rotation shaft adjacent to the armature core and having a plurality of segments disposed in a circumferential direction,
   wherein the motor is a five-phase motor,
   the method comprising:
   forming a riser by bending a part of each segment radially outward;
   short-circuiting every five segments having the same degree of electric potential by means of a short-circuiting wire wound around the riser under a state that the commutator and the armature core are provided on the rotation shaft;

connecting a coil electrically to segments having a potential difference that is equal to a potential difference between the adjacent segments;

winding the coil continuously around the teeth that correspond to a same phase; and fixing the coil and the short-circuiting wire together to the riser.

8. A coil-winding method for a direct-current motor armature, the direct-current motor being an 8-pole-10-slot-20-segment or 12-pole-15-slot-30-segment, the armature comprising:

a rotation shaft supported by a yoke pivotably, the yoke having a plurality of magnetic poles;

an armature core comprising an armature core body attached to the rotation shaft;

a plurality of teeth attached on the armature core body and extending radially in radial directions, the armature core having a plurality of slots extending in an axial direction, the slots formed between the teeth; and a commutator provided on the rotation shaft adjacent to the armature core and having a plurality of segments disposed in a circumferential direction, wherein the motor is a five-phase motor, the method comprising:

forming a riser by bending a part of each segment radially outward, short-circuiting every five segments having a same degree of electric potential by means of a short-circuiting wire wound around the riser under a state that the commutator and the armature core are provided on the rotation shaft;

connecting a coil electrically to the adjacent segments;

winding the coil around each individual tooth; and fixing the coil and the short-circuiting wire together to the riser.

* * * * *

UNITED STATES PATENT AND TRADEMARK OFFICE
CERTIFICATE OF CORRECTION

PATENT NO. : 8,922,089 B2
APPLICATION NO. : 12/312199
DATED : December 30, 2014
INVENTOR(S) : Yoshichika Kawashima et al.

It is certified that error appears in the above-identified patent and that said Letters Patent is hereby corrected as shown below:

ON THE TITLE PAGE (57) Abstract, change

"In a direct-current motor armature 3 corresponding to an 8-pole-10-slot-20-segment or 12-pole-15-slot-30-segment, a connection wire 25 for short-circuiting segments 14 having the same degree of electric potential is provided to a commutator, a coil 12 is connected electrically to the segments 14 having a potential difference that is equal to a potential difference between the adjacent segments 14 and the coil 12 is wound around teeth 9 to form armature coils 7."

to

-- In a direct-current motor armature corresponding to an 8-pole-10-slot-20-segment or 12-pole-15-slot-30-segment, a connection wire for short-circuiting segments having the same degree of electric potential is provided to a commutator, a coil is connected electrically to the segments having a potential difference that is equal to a potential difference between the adjacent segments and the coil is wound around teeth to form armature coils. --;

IN THE SPECIFICATION

Column 1, line 12, add -- This application is a National Stage Entry of PCT/JP2007/071013 filed on October 29, 2007. --;

Column 2, line 9, change "drawbacks, according to a first aspect of the present invention, there is a direct" to -- drawbacks, an invention recited in claim 1 is a direct --;

Column 6, line 5, change "a slot 1d provided" to -- a slot 11d provided --;

Signed and Sealed this
Fifth Day of January, 2016

Michelle K. Lee
*Director of the United States Patent and Trademark Office*

CERTIFICATE OF CORRECTION (continued)
U.S. Pat. No. 8,922,089 B2

IN THE CLAIMS

Column 10, line 6, claim 1, change "armature, the direct" to -- armature, a direct --;

Column 10, line 7, claim 1, change "or 12-pole-15" to -- or a 12-pole-15 --;

Column 10, line 13, claim 1, change "a plurality of teeth attached to the roation shaft and extending radially in radial directions; armature cores having" to -- a plurality of teeth attached on the armature core body and extending radially in radial directions, the armature core having --;

Column 10, line 18, claim 1, change "the armature cores and" to -- the armature core and --;

Column 10, line 45, claim 7, change "armature, the direct" to -- armature, a direct --;

Column 10, line 46, claim 7, change "segment or 12-pole" to -- segment or a 12-pole --;

Column 11, line 9, claim 8, change "armature, the direct" to -- armature, a direct --;

Column 11, line 10, claim 8, change "segment or 12-pole" to -- segment or a 12-pole --.